US007512639B2

United States Patent
Chowdhary et al.

(10) Patent No.: US 7,512,639 B2
(45) Date of Patent: Mar. 31, 2009

(54) MANAGEMENT OF TIME-VARIANT DATA SCHEMAS IN DATA WAREHOUSES

(75) Inventors: Pawan R. Chowdhary, Montrose, NY (US); George Andrei Mihaila, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 11/453,531

(22) Filed: Jun. 15, 2006

(65) Prior Publication Data

US 2007/0294266 A1 Dec. 20, 2007

(51) Int. Cl.
*G06F 17/30* (2006.01)
*G06F 17/00* (2006.01)

(52) U.S. Cl. .................. 707/202; 707/200; 707/102

(58) Field of Classification Search ................ 707/202, 707/200, 102
See application file for complete search history.

(56) References Cited

U.S. PATENT DOCUMENTS

| 2001/0044834 | A1* | 11/2001 | Bradshaw et al. | ........... 709/217 |
| 2005/0071359 | A1* | 3/2005 | Elandassery et al. | ........ 707/102 |
| 2007/0067357 | A1* | 3/2007 | Clark | ........................ 707/203 |

* cited by examiner

*Primary Examiner*—Tony Mahmoudi
*Assistant Examiner*—Nicholas F. Woronko
(74) *Attorney, Agent, or Firm*—Lisa M. Yamonaco; Jon A. Gibbons; Fleit Gibbons Gutman Bongini & Bianco P.L.

(57) ABSTRACT

A system, method, and computer readable medium for preserving information in time variant data schemas are disclosed. The method includes determining if at least one modification request associated with a database schema has been received. In response to the modification request being received, a metadata table associated with the database schema is updated to include at least one entry associated with the modification request. The entry identifies an instance in time when an action associated with the modification request was performed.

1 Claim, 5 Drawing Sheets

| TABLE | TABLE_ID | COLUMN | COLUMN_ID | START_TIME | END_TIME |
|---|---|---|---|---|---|
| WIDGETS | 105 | - | 0 | 2006-05-10 | PRESENT |
| REGION | 109 | - | 0 | 2001-01-03 | 2005-12-01 |
| INVENTORY | 112 | - | 0 | 2001-01-07 | 2001-02-08 |
| INV | 112 | - | 0 | 2001-02-08 | PRESENT |
| CUSTOMER | 104 | CELL_PHONE | 1018 | 2005-06-01 | PRESENT |
| SALES | 101 | REGION_ID | 1008 | 2001-01-03 | 2005-12-01 |
| CUSTOMER | 104 | SSN | 1016 | 2001-01-01 | 2004-12-01 |
| CUSTOMER | 104 | USERID | 1016 | 2004-12-01 | PRESENT |

ORIGINAL COMMAND RECEIVED
ON DECEMBER 1, 2004:
ALTER TABLE CUSTOMER
DROP COLUMN

REGION ID

REWRITTEN CMD:
UPDATE SCHEMA_MANAGER
SET END_TIME = 2005-12-01
WHERE TABLE = 'CUSTOMER'
AND COLUMN = REGION ID

MANAGEMENT OF TIME-VARIANT DATA SCHEMAS IN DATA WAREHOUSES

FIELD OF THE INVENTION

The present invention generally relates to the field of data warehousing, and more particularly relates to preserving information in time-variant data schemas.

BACKGROUND OF THE INVENTION

Data warehouses are typically used for analyzing business activities and perform decision making based on the analyzed activities. The information within a data warehouse can be collected from a many different databases. Data warehouses use measures and dimensions, respectively, to summarize and categorize data. Data warehouses also comprise various data schemas that describe tables, fields within the tables, and the relationships between tables and fields.

During the life-cycle of a relational database table within the data warehouse, it is common to perform schema changes such as adding, removing or renaming columns in tables, creating, dropping or renaming tables, and more as the business needs change. Currently, all these changes are destructive, that is, they override the previous schema of the database. Thus, it is not possible to examine historical data according to the structure it had at the time it was created.

Therefore a need exists to overcome the problems with the prior art as discussed above.

SUMMARY OF THE INVENTION

Briefly, in accordance with the present invention, disclosed are a method, system, and computer readable medium for preserving information in time variant data schemas are disclosed. The method includes determining if at least one modification request associated with a database schema has been received. In response to the modification request being received, a metadata table associated with the database schema is updated to include at least one entry associated with the modification request. The entry identifies an instance in time when an action associated with the modification request was performed.

In another embodiment of the present invention, a system for preserving information in time variant data schemas is disclosed. The system includes at least one information processing system that comprises a data schema modification request analyzer. The data schema modification request analyzer determines if at least one modification request associated with a database schema has been received. The data schema modification request analyzer also determines, in response to the modification request being received, a modification associated with the modification request. The information processing system also includes a data schema modification request modifier. The data schema modification request modifier modifies the modification request, based on the modification to be performed, to update a metadata table associated with the database schema to include at least one entry associated with the modification request. The entry identifies an instance in time when an action associated with the modification request was performed.

In yet another embodiment, a computer readable medium for preserving information in time variant data schemas is disclosed. The computer readable medium includes instructions for determining if at least one modification request associated with a database schema has been received. In response to the modification request being received, a metadata table associated with the database schema is updated to include at least one entry associated with the modification request. The entry identifies an instance in time when an action associated with the modification request was performed.

One advantage of the present invention is that existing information in a data schema is preserved when a modification request is received. For example, when a request to modify a data schema is received, the information is not overwritten or deleted. The old information is annotated with a descriptor identifying when the information became inactive. Any new information created by the modification request is also annotated with a descriptor that indicates when the information was created. Therefore, historical information is available to queries submitted to the system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is an exemplary metadata table, according to an embodiment of the present invention;

DETAILED DESCRIPTION

Figure 1:
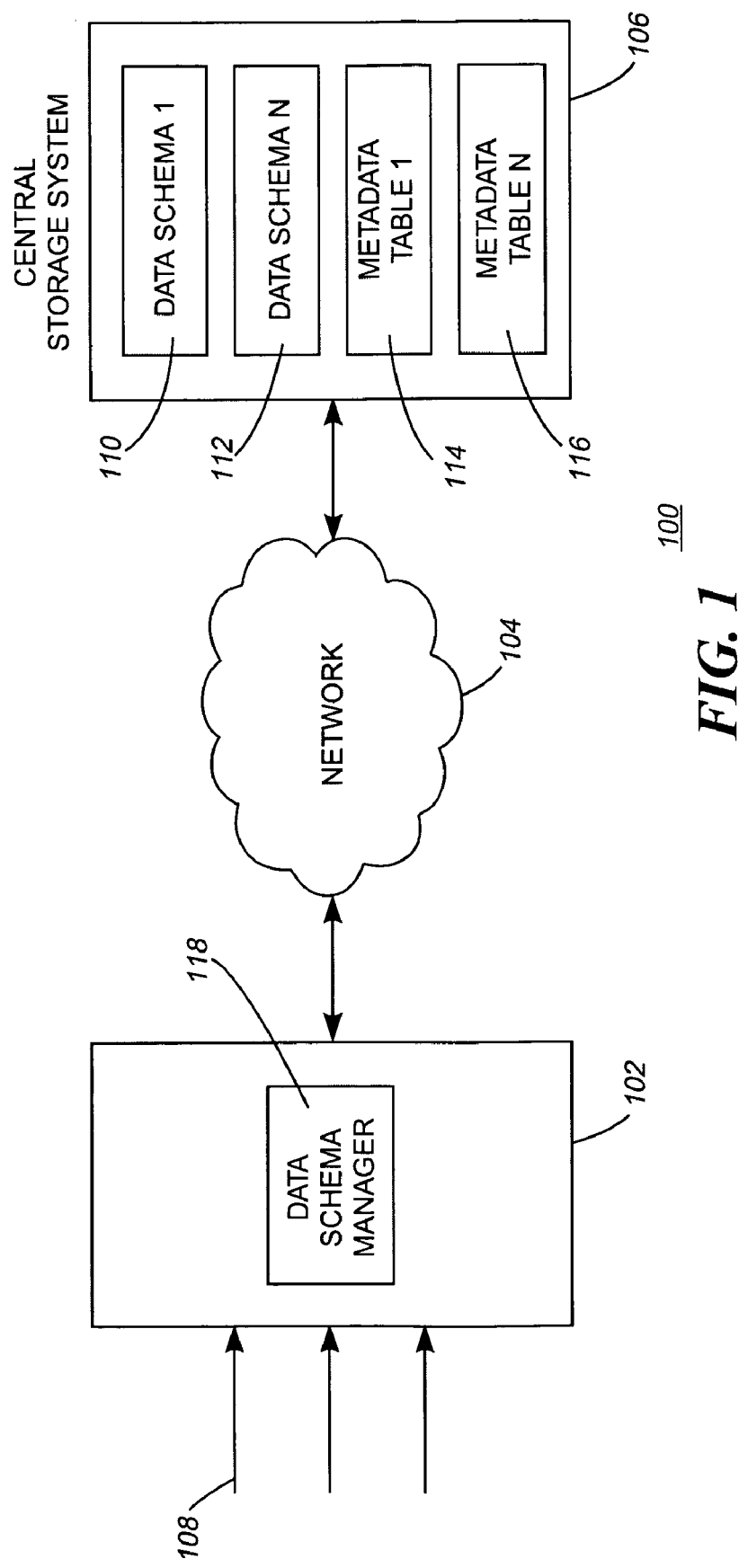
FIG. 1 is a block diagram illustrating an exemplary system, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary System

According to an embodiment of the present invention, as shown in FIG. 1, an exemplary system 100 for preserving information in time-variant data schemas is shown. In one embodiment, the system 100 includes one or more information processing systems 102, a network 104, and one or more central storage systems 106. The network 104, in one embodiment, is a wide area network, local area network, wireless network, and the like. The system 100 also includes inputs streams 108 that comprise, in one embodiment, data schema modification requests. For example, a request to delete a table from a data schema in a data warehouse.

The information processing system 102 includes a data schema manager 118, which is discussed in greater detail below. The central storage system 106, in one embodiment, is a data warehouse comprising data schemas 110, 112 and metadata tables 114, 116 associated with the data schemas 110, 112. In one embodiment, the metadata tables 114, 116 are schema catalogue tables comprising metadata associated with each data schema 110, 112. The metadata tables 114, 116 are discussed in greater detail below. Although shown residing on a separate information processing system, the data schema manager 118, in one embodiment, can reside on the central storage system within a database management system. In another embodiment, the data schema manager 118 resides in a middleware layer of the system 100, wherein the modification requests are intercepted.

Exemplary Information Processing System

Figure 2:
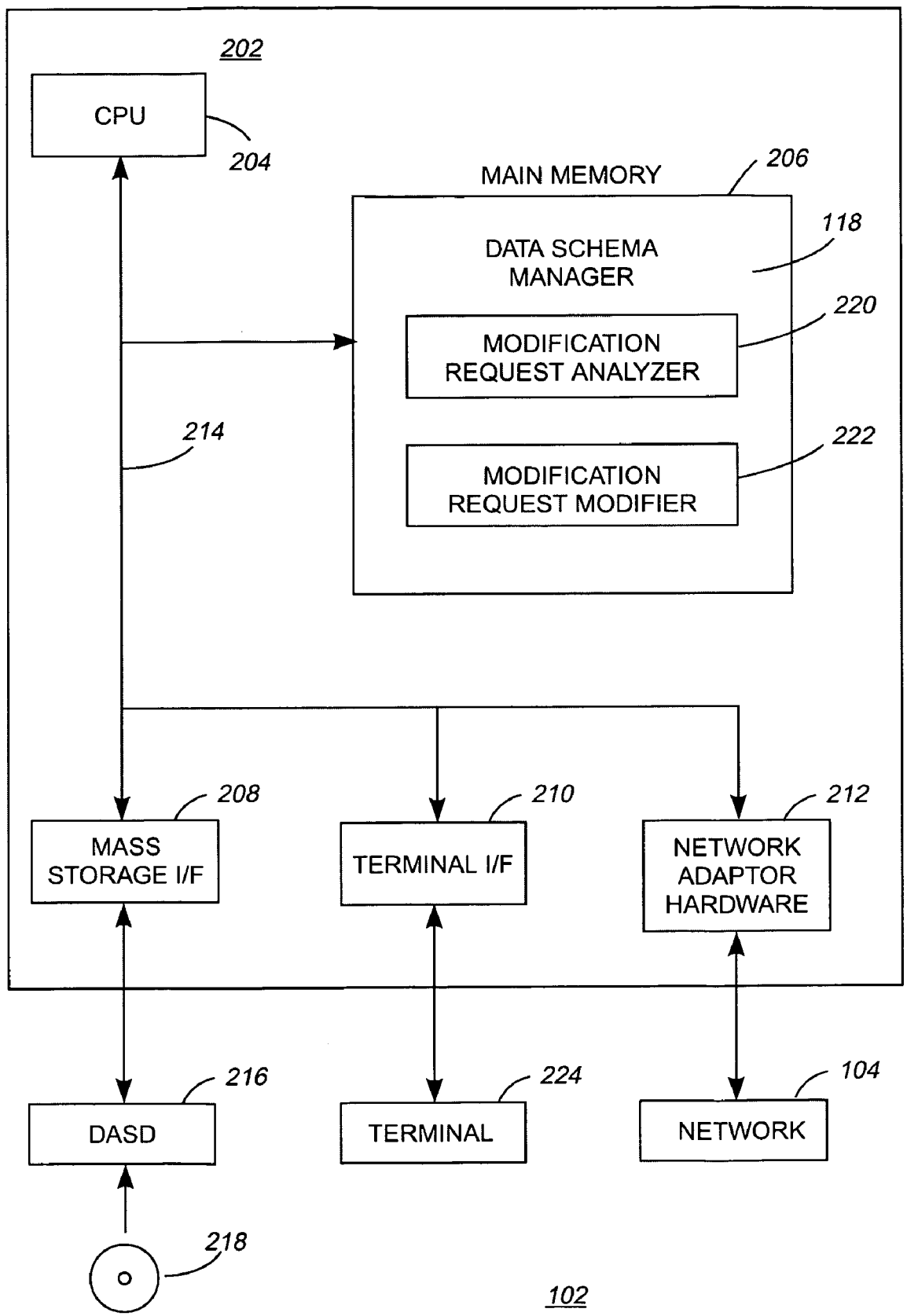
FIG. 2 is a block diagram illustrating a more detailed view of an information processing system, according to an embodiment of the present invention.

FIG. 2 is a block diagram illustrating a more detailed view of the information processing system 102, according to the present invention. The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102 system. One specific type of data storage device is a computer readable medium such as a CD drive, which may be used to store data to and read data from a CD or DVD 218 or floppy diskette CD (not shown). Another type of data storage device is a data storage device configured to support, for example, NTFS type file system operations.

The main memory 206 comprises data schema manager 118, which includes, in one embodiment, a modification request analyzer 220 and a modification request modifier 222. Data schema modification requests are usually destructive, that is, they either delete or override existing data in the data schema. The data schema manager 118, in one embodiment, is configured to intercept data schema modification requests prior to the requests being received at the central storage system 106. In other words, the data schema manager 118 intercepts data schema modification requests before the modifications are performed.

Once a modification request is intercepted by the data schema manager 118 the modification request analyzer 220 analyzes the request to determine a type of modification that is associated with the request. For example, a modification can be adding/deleting a column to/from a table in a data schema, renaming a column, adding/deleting a table to/from a data schema, renaming a table, and the like. The modification request modifier 220 modifies the received request so that the request updates the metadata table 114, 116 associated with the data schema 110, 112 to be modified by the request. For example, the request is modified to add an entry associated with the request to the metadata table 114, 116. The modification performed by the modification request modifier 222 also prevents the request from destroying/overriding existing data in the data schema.

For example, if the modification is to add a column to a data schema, the modification request modifier 222 alters the request so that when the request is received at the central storage system 106, the request adds an entry to the metadata table 114, 116 that reflects the time the new column was added. If the modification request is for deleting a column, the modification request modifier 222, either alters the request or replaces the request so that when the request is received by the central storage system 106 the request updates the metadata table 114, 116 to include an entry reflecting the time when the column became inactive. The alteration also prevents the request from deleting the column. For example, if the modification request modifier 222 did not change the request, the original request would delete the column from the database schema. Therefore, future queries cannot benefit from historical data existing prior to the deletion of the column. By altering or replacing the original modification request, the information from the column is still available to a future query, the column is associated with a time stamp so that a query can recognize when that column was no longer in use.

If the modification request is to rename a column, the modification request modifier 222 augments the original request so that it updates the metadata table 114, 116 to reflect the time when the column with the original name became inactive. The original request is also augmented with another command so that it creates a new row in the metadata table 114, 116 with the new column name and the column ID associated with that had its name changed.

If the modification is to add a table a data schema, the modification request modifier 222 alters the request so that when the request is received at the central storage system 106, the request adds an entry to the metadata table 114, 116 that reflects the time the new table was added. If the modification request is for deleting a table, the modification request modifier 222, either alters the request or replaces the request so that when the request is received by the central storage system 106, the request updates the metadata table 114, 116 to include an entry reflecting the time when the table became inactive. The alteration or new request also prevents the request from deleting the table. For example, if the request was not altered, the original request would delete the table from the database schema. Therefore, future queries cannot benefit from historical data existing prior to the deletion of the table. By altering or replacing the original modification request, the information from the table is still available to a future query, the table is associated with a time stamp so that a query can recognize when that table was no longer in use.

If the modification request is to rename a table, the modification request modifier 222 augments the original request so that it updates the metadata table 114, 116 to reflect the time when the table with the original name became inactive. The original request is also augmented with another command so that it creates a new row in the metadata table 114, 116 with the new table name and the table ID associated with that had its name changed. The metadata table with the added entries discussed above is further discussed below.

Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 224 to computer 202 to provide a user interface to the computer 202. These terminals 224, which are able to be non-intelligent or fully programmable workstations, are used to allow system administrators and users to communicate with the information processing system 102. The terminal 224 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 102. The network adapter hardware 212 is used to provide an interface to the network 104. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. CD 218 and its equivalents, floppy disk (not shown), or other form of recordable media, or via any type of electronic transmission mechanism.

Exemplary Metadata table

FIG. 3 shows an exemplary metadata table 114. As discussed above, a metadata table, in one embodiment, can be a schema catalog table including metadata associated with the various tables within a data schema. The metadata table 114, in one embodiment, includes a table name column 302, a table ID column 304, a column name column 306, a column ID column 308, a start time column 310, and an end time column 312. The start time column 310 and end time column 312 can be created when the metadata table 114 is created or can be added to the metadata table 114 by a modification request modified by the request modifier 222. In the embodiment where the start time column 310 and end time column 312 are created when the metadata table 114 is created, the start time column 310 is populated to show time and/or date when an associated table or column was created. The end time column 312 shows when a column or table in the data schema associated with the metadata table 114 became inactive (e.g. no longer used).

The first row 314 in the metadata table 114 illustrates how the metadata table 114 is updated, according to one embodiment, when a new table is added to a data schema associated with the metadata table 114. FIG. 3 shows that the first row 314 is associated with an action on a row by including a dash symbol in an entry 316 under the column name column 306. When a modification request, which has been altered by the modification request modifier 222, for adding a table to a data schema is received at the central storage system 106, the altered request adds the entry 318 under the start time column 318. This entry shows the time and/or date that the table was created. In one embodiment, the end time column 312 is also updated to include an entry 320 showing that the table is currently in use.

The second row 322 shows that a table with the name REGION is no longer in use. Because there is not another row associated specifically for another table with the same table ID as the table REGION, the table REGION was requested to be deleted. Therefore, the modification request modifier 222 modified the table deletion request to an add entry 324 in the end time column 312 to reflect the time and/or date the table REGION became inactive. For example, the table REGION became inactive on Dec. 1, 2005. The third row 326 is associated with a table INVENTORY that has been renamed. For example, the modification request modifier 222 altered a renaming request to add an entry 328 under the end time column 312 that reflects when the table INVENTORY became inactive. However, the altered renaming request also created a new row, i.e. the fourth row 330 that includes a new name, INV, for the INVENTORY table. The table ID for each of the INVENTORY table and the INV table are the same because they are the same tables. The altered renaming modification request also added an entry 332 under the start time column 310 showing the time and/or date that the column was renamed, which is the same time and/or date included end time column entry 328.

The fifth row 334 is associated with a newly added column CELL_PHONE in the SALES CUSTOMER table. The modification request modifier 222 altered an add column request so that it added an entry 336 under the start time column 310 reflecting the time and/or date that the column CELL_PHONE was added. The sixth row 338 is associated with a REGION_ID column in the SALES table. As can be seen, another row with the same column ID as the REGION_ID column ID does not exist in the metadata table 114. Therefore, a deletion modification request was intercepted and altered by the modification request modifier 222 so that the deletion request added an entry 340 under the end time column 312 to reflect the time and/or date that the column REGION_ID became inactive.

The seventh column 342 and the eight column 344 are associated with a column SSN that has been renamed USERID. The modification request modifier 222 intercepted a renaming modification request and altered the request to add an entry 346 under the end time column 312 to reflect the time and/or date that the column name SSN became inactive. The altered renaming request also added the eight row 344 reflecting the new column name USER ID, which includes the same column ID as when the column was named SSN. An entry 348 was also added by the altered renaming request under the start time column 310 to reflect the time and/or date that the new column name USERID became active. As can be seen, all historical data remains in the metadata table 114 and is not deleted or overridden. Therefore, future queries can make use of the information existing in a database at a previous point in time.

Example of an Altered Modification Request

Figure 4:
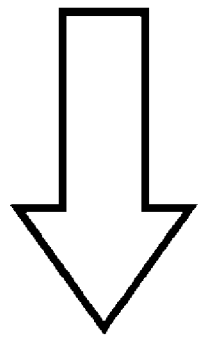
FIG. 4 illustrates an exemplary data schema modification request before and after being modified to create a timestamp entry in a metadata table, according to an embodiment of the present invention.

FIG. 4 shows an exemplary schema modification command 400 before and after being altered by the modification request modifier 222. The schema modification request is for altering a table named CUSTOMER by deleting a column named REGION_ID. If this request was left unaltered, the column REGION_ID is deleted from the CUSTOMER table. The information included in the REGION_ID column is no longer available to a query. However, the modification request modifier 222 intercepts this request before it reaches the central storage system 106. Once intercepted, the modification request modifier 222 rewrites the request to set the end time to the date/time that the column becomes inactive.

Exemplary Processing of Preserving Information in Time Variant Data Schemas

Figure 5:
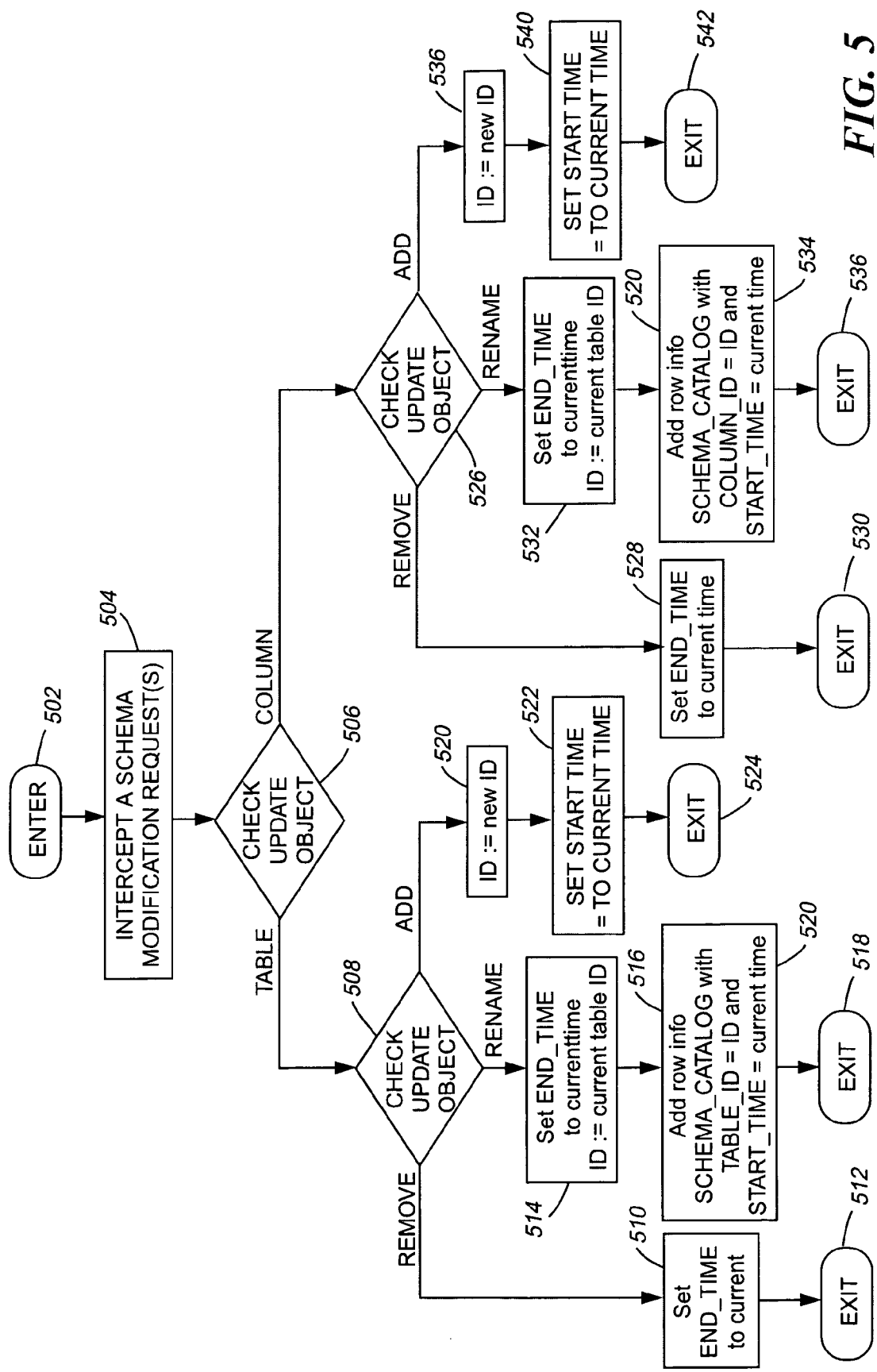
FIG. 5 is an operational flow diagram illustrating an exemplary process of preserving information in time-variant data schemas, according to an embodiment of the present invention.

FIG. 5 shows an exemplary process of preserving information in time variant data schemas. The operational flow diagram of FIG. 5 begins at step 502 and flows directly to step 504. The data schema manager 118, at step 504, intercepts a scheme modification request(s). The data schema manager 118, at step 506, determines the object type to be modified. If data schema manager 118 determines that the object type is a table in a data schema, the data schema manager 118, at step 508, determines the modification type that is associated with the request. If the data schema manager 118 determines that the modification type is a removal of the table from the data schema, the data schema manager 118, at step 510, alters the modification request to set an end-time entry in a metadata table to reflect the time that the table became inactive (e.g. the current time). The table is not deleted from the schema. This is shown, for example, in the second row 322 of the metadata table 114 of FIG. 3. The control flow exits at step 512.

If the data schema manager 118 determines that the modification type is the renaming of a table, the data schema manager 118, at step 514, alters the request to add an entry to the metadata table under an end time column to reflect the time that the current name of the table became inactive (e.g. the current time). The data schema manager 118, at step 516, also alters the request to add a new row to the metadata table, which includes the new table name and the same table ID as the table with the previous name. The request is also altered to add an entry to the metadata table reflecting the creation time of the new table name (e.g. the current time). This is shown, for example, in the third row 326 and the fourth row, respectively, 330 of the metadata table 114 of FIG. 3. The control flow then exits at step 518.

If the data schema manager 118 determines that the modification type is for adding a table, the data schema manager 118, at step 520, alters the request to add a new table ID to the row associated with the new table. In one embodiment, the new table ID is calculated by incrementing the highest table ID by one. The data schema manager 118, at step 522, also alters the request so that it adds an entry to the metadata table to reflect the time and/or date that the new table was created. This is shown, for example, in the first row 314 of the metadata table 114 of FIG. 3. The control flow then exits at step 524.

Returning to step 506, if the data schema manager 118 determines that the object type is a column in a data schema, the data schema manager 118, at step 526, determines the modification type that is associated with the request. If the data schema manager 118 determines that the modification type is a removal of the column from the data schema, the data schema manager 118, at step 528, alters the modification request to set an end-time entry in a metadata table to reflect the time that the column became inactive (e.g. the current time). The column is not deleted from the schema. This is shown, for example, in the sixth row 338 of the metadata table 114 of FIG. 3. The control flow exits at step 530.

If the data schema manager 118 determines that the modification type is the renaming of a column, the data schema manager 118, at step 532, alters the request to add an entry to the metadata table under an end time column to reflect the time that the current name of the column became inactive (e.g. the current time). The data schema manager 118, at step 5534, also alters the request to add a new row to the metadata table, which includes the new column name and the same table ID as the column with the previous name. The request is also altered to add an entry to the metadata table reflecting the creation time of the new column name (e.g. the current time). This is shown, for example, in the seventh row 342 and the eight row 344, respectively, of the metadata table 114 of FIG. 3. The control flow then exits at step 536.

If the data schema manager 118 determines that the modification type is for adding a column, the data schema manager 118, at step 538, alters the request to add a new column ID to the row associated with the column. In one embodiment, the new column ID is calculated by incrementing the highest column ID by one. The data schema manager 118, at step 540, also alters the request so that it adds an entry to the metadata table to reflect the time and/or date that the new column was created. This is shown in the fifth row 334 of the metadata table 114 of FIG. 3. The control flow then exits at step 542.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer-implemented method, on an information processing system, for preserving information in time variant database schemas, the method comprising:

determining if at least one modification request associated with a database schema has been received;

determining a modification associated with the modification request that is to be performed on the database schema;

modifying, based on the modification to be performed, the modification request prior to the modification request being received at a system comprising the database schema by adding at least one instruction to the modification request that instructs the modification request to add at least one entry to a metadata table associated with the database schema, wherein the modifying the modification request further prevents the modification associated with the modification request from deleting at least one of a column and a table from the database schema, and wherein the metadata table is a schema catalog table including metadata associated with a plurality of tables within the database schema, updating, by the modification request based on the at least one instruction, the metadata table to include at least one entry associated with the modification request, wherein the entry identifies an instance in time when an action associated with the modification request was performed on the database schema, and wherein the entry is associated with one of a column and a table in the database schema, wherein in response to determining that the modification associated with the modification request is for adding a column to a table in the database schema, the modifying further comprises:

modifying the modification request by adding at least one instruction to the modification request that instructs the modification request to set a time stamp to reflect a time when the column was added to the database schema;

wherein in response to determining that the modification associated with the modification request is for deleting a column from the database schema, the modifying further comprises:

modifying the modification request by adding at least one instruction to the modification request that instructs the modification request to set a time stamp to reflect a time when the column became inactive; and modifying the modification request by adding at least one instruction to the modification request that prevents the modification request from deleting the column from the database schema;

wherein in response to determining that the modification request is for renaming a column in the database schema, the modifying further comprises:

modifying the modification request by adding at least one instruction to the modification request that instructs the modification request to add a new row comprising at least a new column name associated with the column;

modifying the modification request by adding at least one instruction to the modification request that instructs the modification request to add a time stamp to the new row reflecting a time when the new column name was created; and modifying the modification request by adding at least one instruction to the modification request that instructs the modification request to add an entry to a row corresponding to the column reflecting a time stamp when a name of the column became inactive;

wherein in response to determining that the modification associated with the modification request is for adding a table to the database schema, the modifying further comprises:

modifying the modification request by adding at least one instruction to the modification request that instructs the modification request to set a time stamp to reflect a time when the table was added to the database schema;

wherein in response to determining that the modification associated with the modification request is for deleting a table from the database schema, the modifying further comprises:

modifying the modification request by adding at least one instruction to the modification request that instructs the modification request to set a time stamp to reflect a time when the table became inactive; and modifying the modification request by adding at least one instruction to the modification request that prevents the modification request from deleting the table from the database schema;

wherein in response to determining that the modification request is for renaming a table in the database schema, the modifying further comprises:

modifying the modification request by adding at least one instruction to the modification request that instructs the modification request to add a new row comprising at least a new table name associated with the table;

modifying the modification request by adding at least one instruction to the modification request that instructs the modification request to add a time stamp to the new row reflecting a time when the new table name was created; and modifying the modification request by adding at least one instruction to the modification request that instructs the modification request to add a time stamp to a row corresponding to the table reflecting a time when a name of the table became inactive.

* * * * *